United States Patent [19]
Ueda et al.

[11] Patent Number: 4,772,130
[45] Date of Patent: Sep. 20, 1988

[54] QUARTZ THERMOMETER

[75] Inventors: Toshitsugu Ueda; Fusao Kohsaka; Toshio Iino, all of Tokyo, Japan

[73] Assignee: Yokogawa Electric Corporation, Tokyo, Japan

[21] Appl. No.: 869,103

[22] Filed: May 30, 1986

[30] Foreign Application Priority Data

Jun. 17, 1985 [JP] Japan .................. 60-131091

[51] Int. Cl.$^4$ .................. G01K 11/26; H04R 17/00
[52] U.S. Cl. .................. 374/117; 310/361; 29/25.35
[58] Field of Search .................. 374/117, 118, 119, 142; 310/361, 368; 29/25.35

[56] References Cited

U.S. PATENT DOCUMENTS

| | | | |
|---|---|---|---|
| 3,697,766 | 10/1972 | Ganter et al. | 310/370 |
| 4,039,969 | 8/1977 | Martin | 374/117 |
| 4,172,908 | 10/1979 | Shibata et al. | 29/25.35 |
| 4,255,228 | 3/1981 | Vig | 310/361 |
| 4,263,702 | 4/1981 | Vig et al. | 29/25.35 |
| 4,313,071 | 1/1982 | Hermann et al. | 310/361 |
| 4,350,918 | 9/1982 | Sato | 310/361 |
| 4,398,115 | 8/1983 | Gagnepain et al. | 374/117 |
| 4,437,773 | 3/1984 | Dinger et al. | 374/117 |
| 4,453,105 | 6/1984 | Kogure | 310/361 |
| 4,472,652 | 9/1984 | Brice et al. | 310/313 B |
| 4,472,655 | 9/1984 | Kawashima | 374/117 |
| 4,472,656 | 9/1984 | Franx | 374/117 |
| 4,592,663 | 6/1986 | EarNisse et al. | 374/117 |
| 4,634,914 | 1/1987 | Ballato | 310/313 D |

FOREIGN PATENT DOCUMENTS

| | | | |
|---|---|---|---|
| 0098651 | 1/1984 | European Pat. Off. | 374/117 |
| 0075892 | 12/1976 | Japan | 310/368 |
| 0026723 | 2/1982 | Japan | 374/117 |
| 0206935 | 12/1983 | Japan | 374/117 |
| 0206936 | 12/1983 | Japan | 374/117 |
| 0170737 | 9/1984 | Japan | 374/117 |

Primary Examiner—William A. Cuchlinski, Jr.
Assistant Examiner—Thomas B. Will
Attorney, Agent, or Firm—Moonray Kojima

[57] ABSTRACT

A quartz thermometer adapted to measure the ambient temperature through detection of a change in the resonance frequency of a quartz resonator due to change in the temperature, wherein a quartz wafer of 0.02 to 0.2 mm thickness is cut from a region of a quartz within −30° to −70° in terms of rotation angle about the X axis of the quartz thereby to form a quart resonator within a range of between −15° to +15° in terms of angle of rotation about the Z' axis within the plane of the quartz wafer; and wherein thin metallic films are formed on the surfaces of the resonator to serve as exciting electrodes. The resonator and electrodes are produced by photolithography and anisotropic quartz etching processes. The resulting quartz thermometer has a large first order temperature coefficient of frequency.

14 Claims, 5 Drawing Sheets

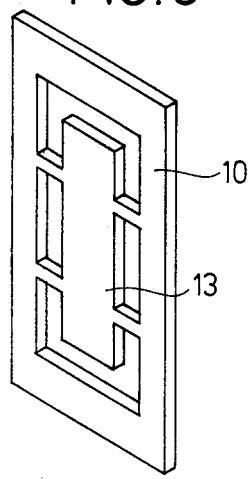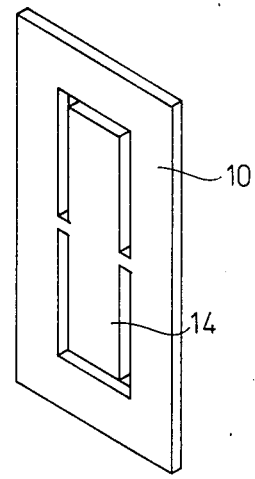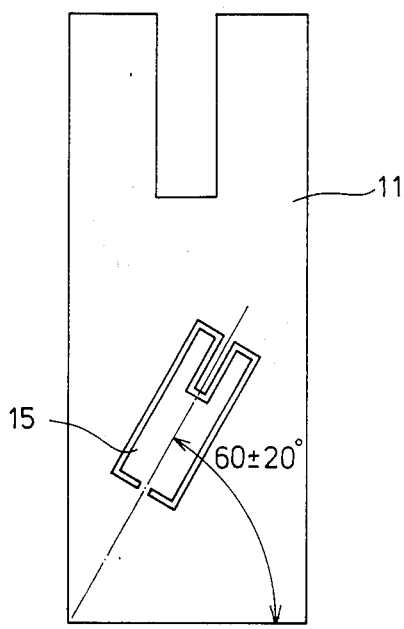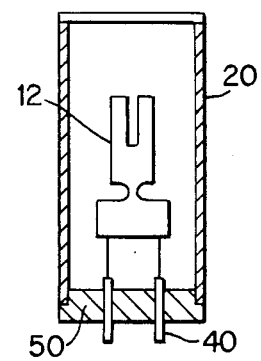

QUARTZ THERMOMETER

BACKGROUND OF THE INVENTION

1. Field of Invention

This invention relates to a quartz thermometer utilizing a quartz resonantor as a temperature measuring element and adapted for measuring the temperature by detecting the oscillation frequency of the quartz resonator.

2. Description of Prior Art

Quartz has a crystalline anisotropy which can attain various values of temperature coefficient ranging from zero to a large value, by suitably selecting the cutting angle thereof. A quartz thermometer which utilizes a quartz resonator having a large temperature coefficient exhibits superior resolution and stability.

The production of the quartz thermometer, however, is hindered because certain characteristics depend to a large degree upon the cutting of the quartz resonator from the quartz, such as for example, the etching process and temperature characteristics.

SUMMARY OF THE INVENTION

Accordingly, an object of the invention is to overcome the aforementioned and other deficiencies and disadvantages of the prior art.

Another object is to provide a quartz thermometer having a large temperature coefficient by a simple production method wherein the quartz resonator and exciting electrodes are produced by photolithography and by quartz anisotropy etching.

The foregoing and other objects are attained by the invention which encompasses a quartz thermometer and resonator produced by a process comprising the steps of cutting a quartz wafer of a predetermined thickness from a predetermined region of a quartz in terms of a rotation angle from the X axis of the quartz; forming a quartz resonator within a predetermined region in terms of a planar rotation angle with respect to the Z' axis on the plane of the quartz wafer; and forming thin metal films on the surfaces of the quartz resonator, which serve as exciting electrodes.

BRIEF DESCRIPTION OF DRAWINGS

FIG. 8 is a perspective view depicting the shape of a flexural vibrating resonator.

FIG. 9 is a perspective view depicting a longitudinal mode resonator.

FIG. 10 is a top view depicting a quartz resonator having formed therein a resonator for generating a reference clock.

FIG. 11 depicts a resonator formed in a container.

DETAILED DESCRIPTION OF PREFERRED EMBODIMENTS.

Figure 1:
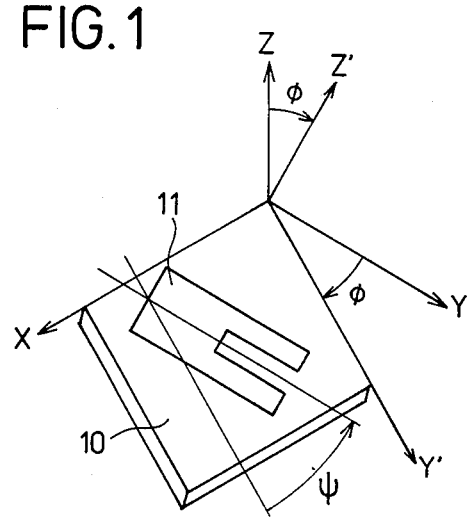
FIG. 1 is a perspective view of a quartz thermometer used to explain an illustrative embodiment of the invention, wherein is depicted the position in the quartz from which a quartz wafer is cutout and the rotation angle of the quartz resonator about the Z' axis on the quartz wafer.

Turning now to FIG. 1, there is shown X,Y and Z crystalline axis of a Z-cut quartz. A quartz wafer 10 from which a resonator is formed has been cut by rotation angle $\phi$ about the X axis. The coordinate system of the wafer 10 is defined by X, Y', Z'. A quartz resonator 11 is rotated by an angle $\phi$ about the Z' axis within the plane of quartz wafer 10.

Figure 2:
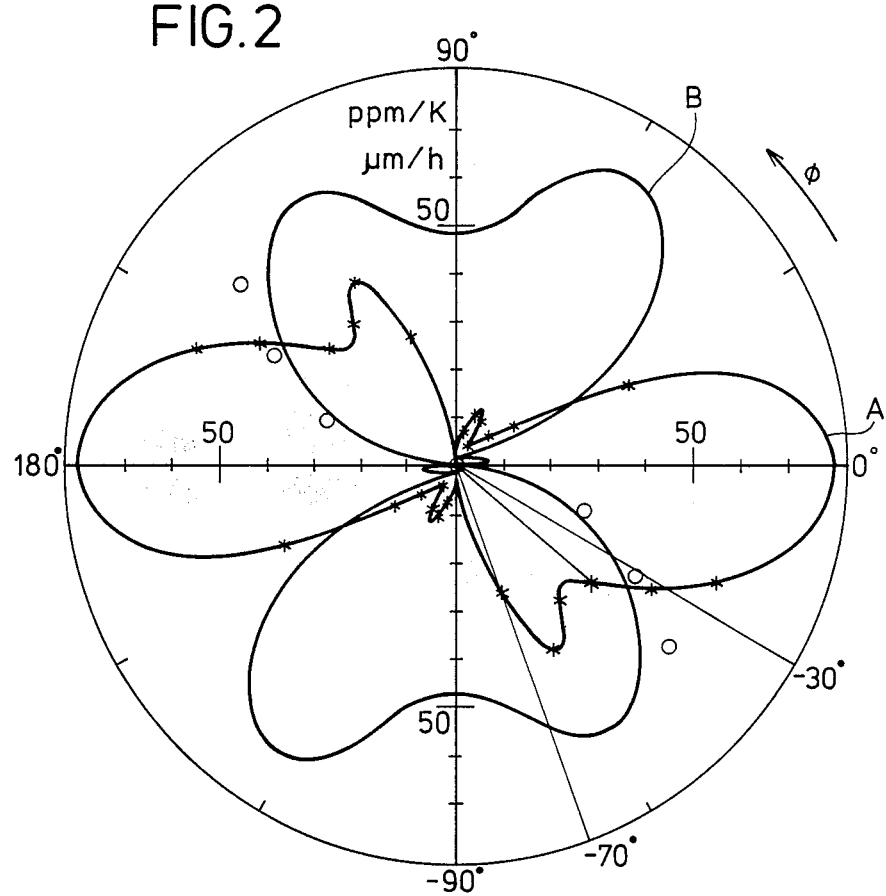
FIG. 2 is a chart depicting the relationship between the etching rate and the first order TCF in relation to the angle of cutting of the quartz wafer out of the quartz.

FIG. 2 shows, in a polar coordinate system using the angle $\phi$ as a parameter, the rate of etching of wafer 10 cut out at angle $\phi$ about X axis by an etchant, which is saturated aqueous solution of ammonium bifluoride (NH$_4$HF) at 80° C., for example. The absolute value of the first order temperature coefficient of frequency (herein called "TCF") of quartz resonator 11 of the planar angle, $\psi = 0°$.

Curve A was obtained by connecting experimental values * of the etching rate per hour by a spline function (unit $\mu$m/H). Curve B represents the absolute values 0 of the calculated values of the first order TCF (unit ppm/K).

When the resonator is used as a temperature sensor, it is necessary that the resonator have a large etching rate for easier processing, and that at the same time, it have a large first order TCF for a sufficiently high sensitivity to temperature. These conditions are when the angle $\phi$ is selected within the range of $-30°$ to $-70°$, as can be seen in FIG. 2. In order that the quartz wafer 10 be processed by photolithography and anisotropic etching, the wafer thickness should not exceed 0.2 mm because a thickness exceeding 0.2 mm makes the processing by anisotropic etching materially impossible. On the other hand, any thickness of the wafer which is smaller than 0.02 mm makes it difficult to handle the wafer during processing.

The quartz thermometer of the invention makes use of the quartz wafer 10 which is cut out to meet the above conditions.

Figure 5:
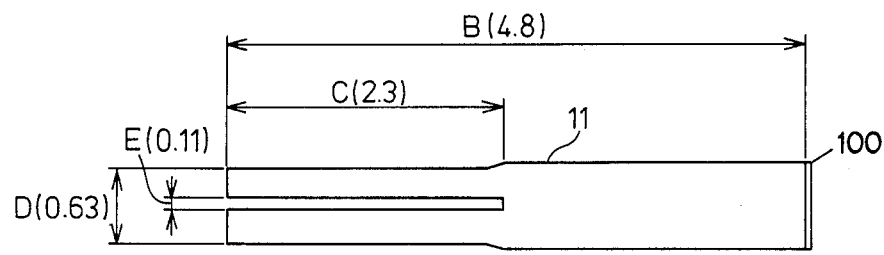
FIG. 5 is an elevation view depicting a tuning fork shaped resonator.

The quartz has piezoelectric characteristics so that it can be oscillated by providing exciting electrodes on the surfaces thereof, such as in the form of thin film patterns of, for example, gold, chrome, etc., such as shown in FIG. 5 as number 100. However, since the piezoelectric characteristics have anisotropy, it is necessary to determine the conditions for facilitating the excitation. The ease of excitation is represented by an index known as crystal impedance, i.e. equivalent series resistance, which will be referred to as "CI value". The CI value depends both on the cutting angle $\phi$ and the planar angle $\psi$ about the Z' axis on the cut out quartz wafer. The smaller the CI value, the easier the excitation of the resonator.

Figure 3:
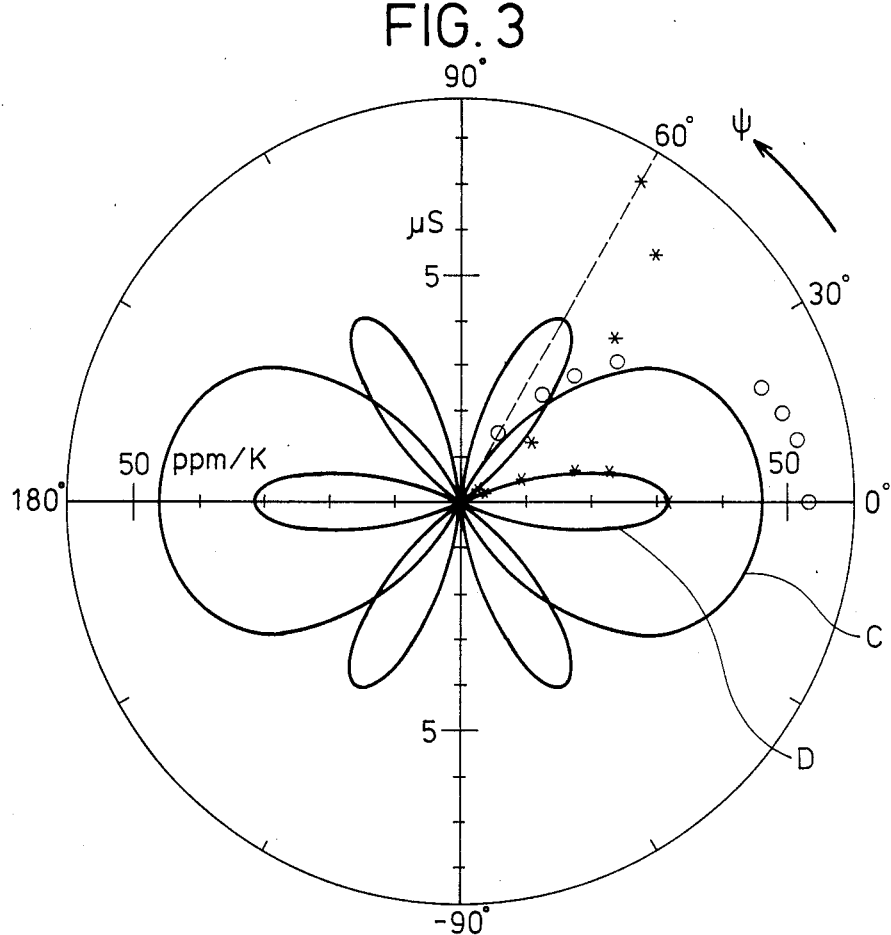
FIG. 3 is a chart depicting the relationship between the CI value and the first order TCF for varying the planar rotation angle about the Z' axis on a quartz wafer cut at a cutting angle $\phi = -40.23°$.

FIG. 3 shows a polar coordinate system which represents the CI-TFC characteristics of the quartz resonator which has been cut out at angle $\phi = -40.23°$, using the planar angle about the Z' axis as a parameter. Curve D represents the reciprocal (unit, $\mu$S) of the calculated CI value (* represents experimental values). Curve C represents the absolute value (unit, ppm/K) of the calculated value of the first order TCF (0 represents the experimental value).

It can be seen that a small CI value which ensures easy excitation of the resonator and a large first order TCF value which provides high sensitivity to the thermometer, are simultaneously obtained when planar rotation angle $\psi$ is around 0°. It can be seen, also, that when the planar rotation angle $\psi$ is about 60°, 120°, 240° and 300°, the absolute value of the first order TCF is so small that the temperature sensitivity is too small, although a large CI value is obtained, to have a small CI value.

According to the invention, preferably, the quartz wafer is cut out at an angle $\psi$ of $-30°$ to $-70°$, in a thickness ranging between 0.02 mm and 0.2 mm, and a tuning fork like shaped quartz resonator is formed from the wafer such that the planar rotation angle $\psi$ about the Z' axis ranges between $-15°$ and $+15°$. This tuning fork shaped resonator is processed by photolithography and quartz anisotropic etching.

Figure 4:
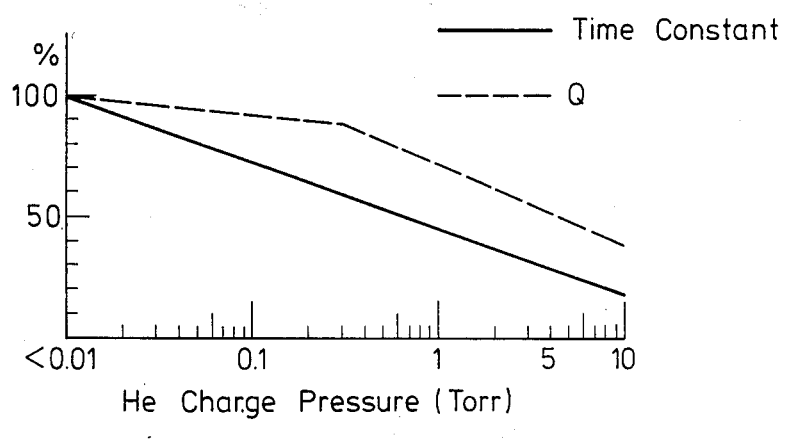
FIG. 4 is a graph depicting the relationship between the time constant and the Q of the resonator in a container charged with He gas.

The resonator is placed in a vacuum container and excited while the pressure in the container is gradually increased by introduction of inert gas, such as He gas. Such a container is depicted in FIG. 11 wherein resonator 12 is contained in vacuum container 20 with terminals 40 connected to resonator 12 through base 50. The relationship between the time constant of the resonator (solid line) and the Q (broken line) with varying internal pressure of the container was measured and the results are shown in FIG. 4. The ordinate represents the time constant and the Q value in terms of percent to the values obtained in the case of vacuum. The abscissa represents the pressure of the inert gas (measured in Torrs).

It can be seen from FIG. 4 that the time constant becomes shorter, to thereby improve the thermal response as the inert gas pressure is increased and that the Q value representing the stability of the frequency characteristics is reduced. Hence, it is necessary to suitably select the pressure of the inert gas which is charged into the container. The pressure of the inert gas in the container was preferably within a range of 0.01 to 10 Torr.

FIG. 5 depicts an illustrative embodiment of the tuning fork shaped resonator 11 shown in FIG. 1, and has the following dimensions, as an example.

| | |
|---|---|
| Cutting angle about X axis | $-40.23°$ |
| Rotation angle about Z' axis | 0° |
| Thickness | 0.07 mm |
| Overall length B | 4.8 mm |
| Length of vibrating beam C | 2.3 mm |
| Width of cutting E | 0.11 mm |
| Width of vibrating beam D | 0.63 mm. |

Figure 6:
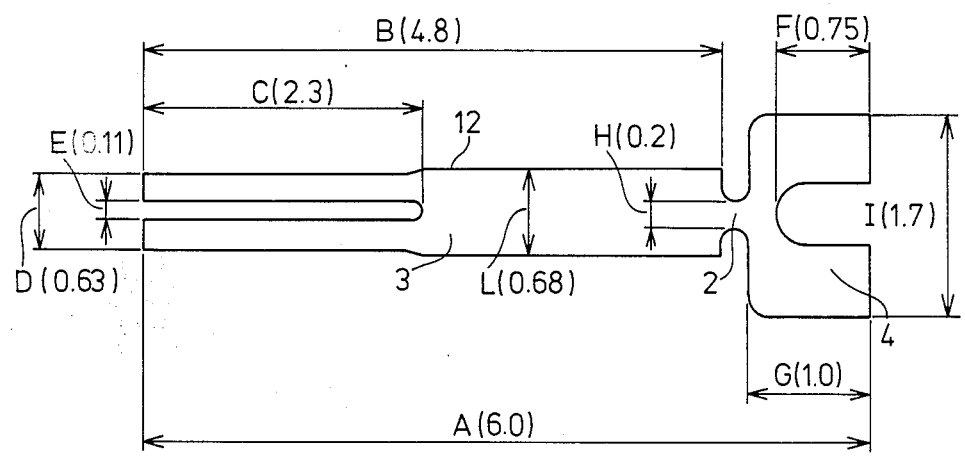
FIG. 6 is an elevation view depicting a tuning form shaped resonator having a neck portion.

Another illustrative embodiment of the resonator is shown in FIG. 6, wherein the tuning fork has a contracted portion 2 which divides the tuning fork shaped resonator 12 into a vibrating beam portion 3 and bifurcated fixed ends 4, and has, for example, the following dimensions.

| | |
|---|---|
| Overall length A | 6.0 mm |
| Length of vibrating beam B | 4.8 mm |
| Width of vibrating beam D | 0.63 mm |
| Length of vibrating beam C | 2.3 mm |
| Width of cutting E | 0.11 mm |
| Width of neck H | 0.2 mm |
| Breadth of fixed end I | 1.7 mm |
| Height of fixed end G | 1.0 mm |

In this resonator 12, the neck 2 serves to prevent any change in the resonance frequency of the vibrating beam 3. The change is caused by the transmission of strain from the fixed ends 4 of the resonator 12, particularly the strain which is caused by difference in thermal expansion coefficient between the quartz and the material to which fixed end 4 of resonator 12 is bonded. Neck 2 effectively reduces the hysteresis which may otherwise be caused by the temperature cycle applied to the resonator.

It is to be understood that the dimensions of the tuning fork shaped resonators of FIGS. 5,6 are only illustrative. Other dimensions and shapes may be used to carry out the invention.

Figure 7A:
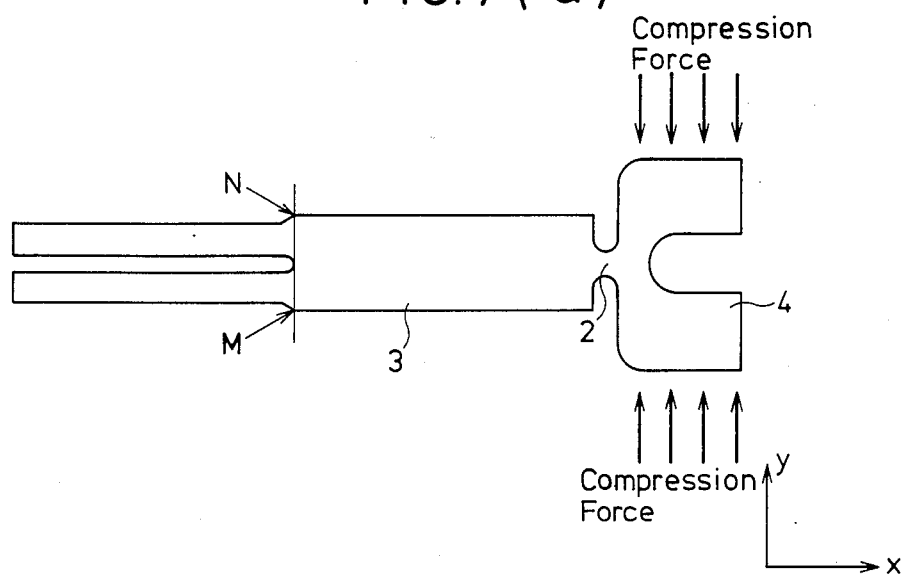
FIG. 7(A) is an elevational view similar to FIG. 6.
Figure 7B:
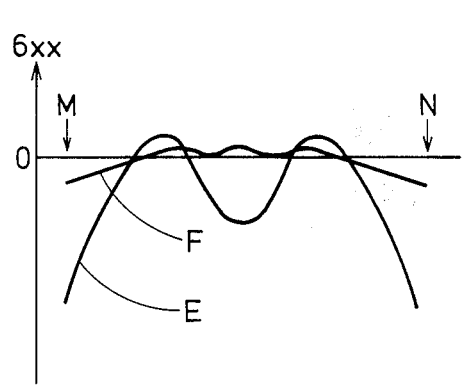
FIGS. 7(B) and 7(C) are graphs depicting stresses occurring in the cross-section at the base portion of the branches of the resonator of FIG. 7(A) taken along line M-N, when compression forces are applied to both sides of the fixed end, with FIG. 7(B) depicting the case where the resonator has no neck, and FIG. 7(C) depicting the case where the resonator has a neck of a width which is 50% of the vibrating portion.
Figure 7C:
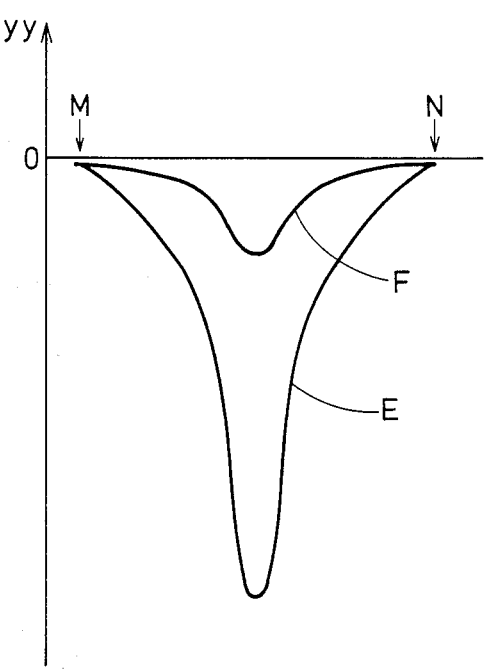

FIGS. 7 (A), 7(B), 7(C) show the principal stresses $\sigma_{xx}$ and $\sigma_{yy}$ generated in the cross section of the base of the vibrating beam taken along line M-N caused when compressive forces are applied to both sides of the fixed ends 4, and calculated by the finite element method, for (1) the case where the tuning fork which is reduced 3 does not have any neck, and (2) the case where the neck 2 which is reduced an amount corresponding to 50% of the tuning fork portion 3 is provided, respectively. More specifically, in FIG. 7(A) compressive forces are applied to the fixed ends 4 of tuning fork 3. FIGS. 7(B), and 7(C) are graphs showing the primary stresses $\sigma_{xx}$ and $\sigma_{yy}$ in the cross section M-N, wherein curves E and F, show, respectively, the stresses observed when the neck is not provided. From FIGS. 7(A), 7(B), 7(C), it can be seen that the maximum stress can be reduced to one-quarter ($\frac{1}{4}$) or less by the provision of the contracted neck portion.

It has also been found that the influence due to the fixed ends of the resonator, becomes smaller as the neck portion becomes narrower. On the other hand, the mechanical strength becomes smaller as the neck portion becomes smaller. Thus, according to the invention, preferably, the width of the neck is selected to range from between 10 to 50% of the width of the tuning fork portion (or otherwise called vibrating beam).

The described characteristics of the resonator can apply also to resonators other than the tuning fork shaped neck resonator, which makes use of longitudinal vibrations. Namely, equivalent effects can be obtained with longitudinal resonator 13 formed in a quartz wafer 10, such as depicted in FIG. 8, or with a flexural resonator 14, formed in a quartz wafer 10, as shown in FIG. 9.

FIG. 10 shows another illustrative embodiment wherein a second additional resonator 15 is formed, as a resonator element for producing reference signals or clock signals, within the resonantor 11 at a planar rotation angle of 60°±20° (or 120°±20°, or 240°±20°) about the Z' axis. The results of the measuring resonator element are standardized against the results of the reference resonator element, thereby to further improve the accuracy of the thermometer. In this embodiment, since the two quartz resonators can be processed in the same manner, any fluctuations of the quality caused by the production thereof, can be substantially eliminated. It is also possible with this embodiment, to cancel influences due to aging, since the measuring resonator and the reference resonator are both used under same conditions. In addition, the construction of the apparatus is simplified because the tuning fork resonator does not require an external clock.

Advantageously, the invention provides a quartz thermometer which has a large first order TCF and which can easily be produced by etching and which also uses the simple photolithography process.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A quartz thermometer comprising a quartz resonator comprising a tuning fork of a desired shape and adapted to measure the ambient temperature from a change in the resonance frequency of said quartz resonator, said quartz resonator being produced by the steps of
   rotating a Z-cut quartz plate about its X-axis by an angle ranging from $-30$ to $-70$ degrees so that said plate has new coordinate axes of X, Y' and Z'; and
   forming a quartz resonator of a thickness of 0.002 mm to 0.2 mm from a portion of said Z-cut plate falling in the range of from $-15$ to $+15$ degree with respect to the Z' axis; wherein
   said forming is by anisotropic etching of said quartz plate to produce the desired thickness and shape of said tuning fork by use of an aqueous solution comprising ammonium bifluoride.

2. The device of claim 1, wherein said resonator comprises a flexural resonator.

3. The device of claim 2, wherein said flexural resonator comprises a vibrating beam.

4. The device of claim 3, wherein said vibrating beam comprises a central portion between ends thereof and a neck portion having a width which is about 10 to 50% of the width of said beam, wherein said neck portion prevents transmission of strain produced in one of said ends.

5. The device of claim 2, wherein said flexural resonator comprises a rectangular plate formed in said quartz wafer by removing a portion of said quartz wafer such that said plate is supported at four points with two points being on sides opposing each other.

6. The device of claim 1, wherein said quartz resonator comprises a longitudinal resonator which is formed by cutting a portion of said quartz wafer such as to leave a rectangular plate which is supported on two opposing points.

7. The device of claim 1, wherein said quartz resonator is mounted in a container which is charged with an inert gas at a pressure within the range of 0.01 to 10 Torrs.

8. A quartz thermometer comprising a quartz resonator which changes its resonance frequency in response to change in ambient temperature so as to indicate ambient temperature; said quartz thermometer being produced by the steps comprising
   rotating a Z-cut quartz plate about its X-axis by an angle ranging from $-30$ to $-70$ degrees so that said plate has new coordinate axes of X, Y' and Z';
   forming a quartz resonator of a thickness of 0.02 mm to 0.2 mm from a portion of said Z-cut plate falling in the range of from $-15$ to $+15$ degrees with respect to the Z' axis;
   forming thin metallic films on the surface of said quartz resonator, said films being used as exciting electrodes; and wherein
   said quartz resonator and said exciting electrodes are formed by photolithography and anisotropic quartz etching;
   wherein said quartz resonator comprises a second resonator formed therein for producing reference clock signals, said second resonator being formed within the region of $60°\pm20°$, $120°\pm20°$ or $240°\pm20°$ in terms of rotation angle about the Z' axis.

9. The device of claim 8, wherein said resonator comprises a flexural resonator.

10. The device of claim 9, wherein said flexural resonator comprises a vibrating beam.

11. The device of claim 10, wherein said vibrating beam comprises a central portion between ends thereof and a neck portion having a width which is about 10 to 50% of the width of said beam, wherein said neck portion prevents transmission of strain produced in one of 12. The device of claim 9, wherein said flexural resonator comprises a rectangular plate formed in said quartz wafer by removing a portion of said quartz wafer so that said plate is supported at four points with two points being on sides opposing each other.

13. The device of claim 8, wherein said quartz resonator comprises a longitudinal resonator which is formed by cutting a portion of said quartz wafer so that a rectangular plate is formed supported on two opposing points.

14. The device of claim 8, wherein said quart resonator is mounted in a container, said container being charged with an inert gas at a pressure within the range of 0.01 to 10 Torrs.

* * * * *